(12) United States Patent
Huang et al.

(10) Patent No.: US 8,979,333 B2
(45) Date of Patent: Mar. 17, 2015

(54) PROJECTOR LIGHT SOURCE ASSEMBLY

(71) Applicants: Premier Image Technology(China) Ltd., Foshan (CN); Hon Hai Precision Industry Co., Ltd., New Taipei (TW)

(72) Inventors: Kai Huang, New Taipei (TW); Chi-Chao Luo, Shenzhen (CN)

(73) Assignees: Premier Image Technology(China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 13/869,903

(22) Filed: Apr. 24, 2013

(65) Prior Publication Data

US 2013/0322095 A1 Dec. 5, 2013

(30) Foreign Application Priority Data

May 31, 2012 (CN) .......................... 2012 1 0176222

(51) Int. Cl.
*F21V 29/00* (2006.01)
(52) U.S. Cl.
CPC .................................... *F21V 29/004* (2013.01)
USPC .......................................... 362/457; 174/68.3

(58) Field of Classification Search
USPC .............. 362/457, 458; 174/72 A, 68.3, 75 C
See application file for complete search history.

(56) References Cited

U.S. PATENT DOCUMENTS

| 5,610,472 | A | * | 3/1997 | Schmitt, Jr. ............... 313/318.12 |
| 6,420,656 | B1 | * | 7/2002 | Sugiyama et al. ......... 174/110 R |
| 6,860,630 | B2 | * | 3/2005 | Wu ................................. 362/581 |
| 2006/0063410 | A1 | * | 3/2006 | Lin ................................. 439/242 |
| 2008/0278654 | A1 | * | 11/2008 | Hwang ........................... 349/58 |

* cited by examiner

*Primary Examiner* — Laura Tso
(74) *Attorney, Agent, or Firm* — Novak Druce Connolly Bove + Quigg LLP

(57) ABSTRACT

A light source assembly includes a light source, a seat, and a wire structure. The seat includes an electrical pin electrically connected to the light source. The wire structure includes a connecting wire. The connecting wire includes a wire and a protecting pipe. The protecting pipe is made of high-temperature resistance material and sleeved on one end of the wire. The end of the wire sleeved with the protecting pipe is connected to the electrical pin.

8 Claims, 2 Drawing Sheets

PROJECTOR LIGHT SOURCE ASSEMBLY

BACKGROUND

1. Technical Field

The present disclosure relates to projector light source assemblies, and particularly to a wire structure of the light source assembly.

2. Description of Related Art

Projectors generally include a light source, a connector, and a wire structure connecting the light source to the connector. In operation, the light source generates a great amount of heat and may burn the wire structure, breaking down the connection.

Therefore, it is desirable to provide a light source assembly, which can overcome the limitations described.

DETAILED DESCRIPTION

Embodiments of the disclosure will be described with reference to the drawings.

Figure 1:
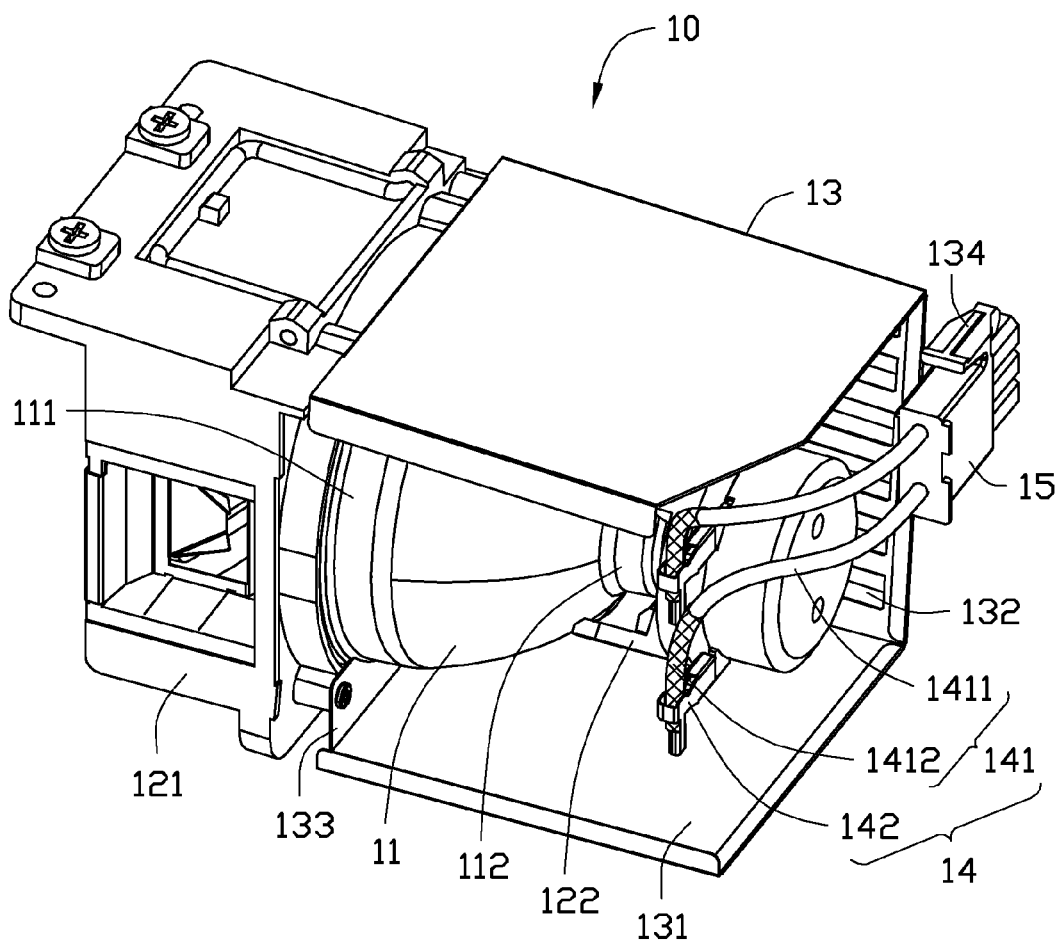
FIG. 1 is an isometric view of a light source assembly in accordance with an exemplary embodiment.
Figure 2:
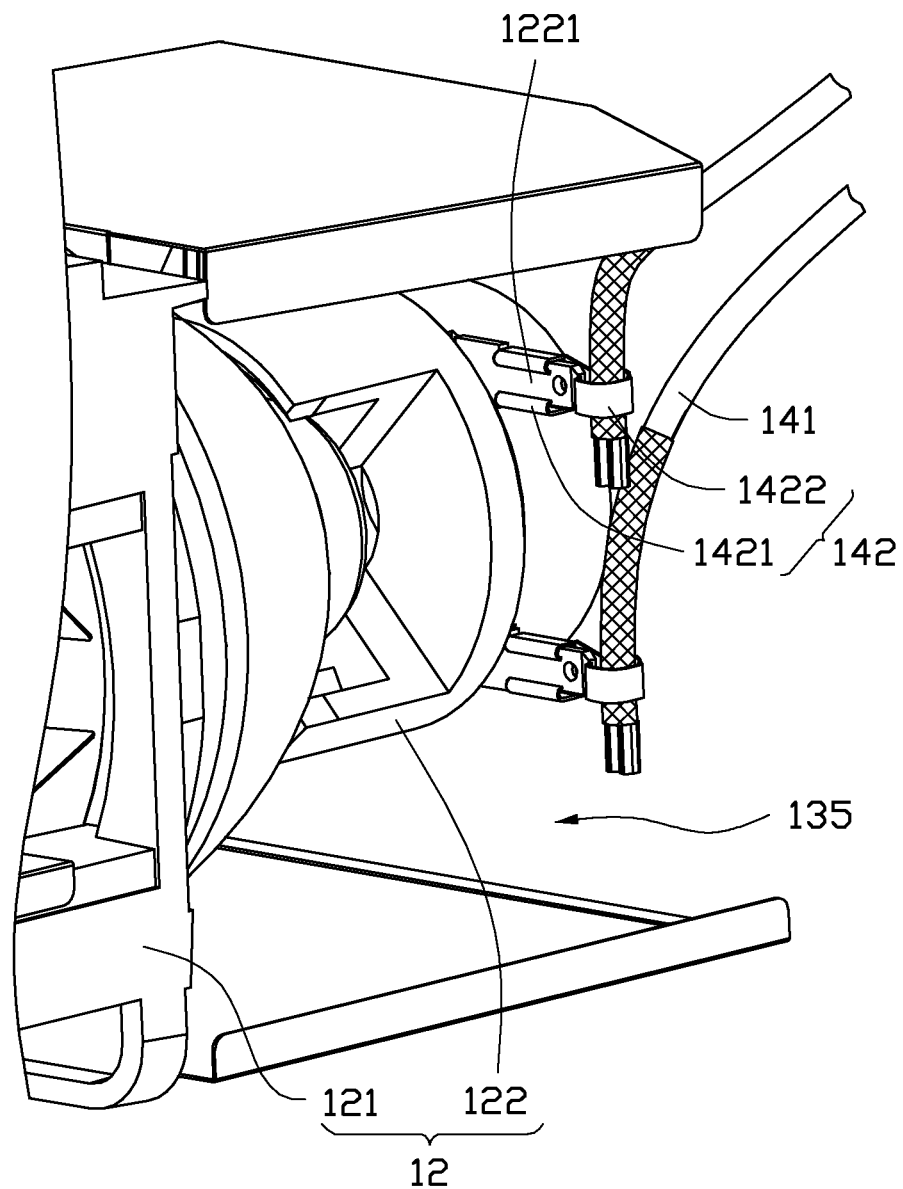
FIG. 2 is an isometric view of a wire structure connected to a seat of the light source assembly of FIG. 1.

Referring to FIGS. 1-2, a light source assembly 10, according to an exemplary embodiment, includes a light source 11, a position seat 12, a protecting case 13, a wire structure 14, and a connector 15. In the embodiment, the light source assembly 10 is used in a projector (not shown).

The light source 11 includes a front end 111 and a rear end 112 opposite to the front end 111. The rear end 112 is an electrical connecting end. Light rays emit from the front end 111. In the embodiment, the light source 11 is tungsten-halogen lamp, a metal halide lamp, an ultra-pressure mercury lamp, or a xenon lamp.

The position seat 12 includes a front seat 121 and a rear seat 122. The front seat 121 is fixed at the front end 111 of the light source 11, and is configured for protecting the light source 11. The rear seat 122 is fixed at the rear end 112 of the light source 11, and is electrically connected to the rear end 112 of the light source 11. The rear seat 122 includes two electrical pins 1221, and the two electrical pins 1221 are parallel with each other.

The protecting case 13 is frame-shaped, and includes two first plates 131, a second plate 132, two fixing plates 133, and a supporting frame 134. The two first plates 131 are perpendicularly connected to two opposite edges of the second plate 132, and extend outward from a same side of the second plate 132. The two fixing plate 133 are respectively perpendicularly connected to edges of the two first plates 131, and are opposite to each other. The first plates 131 and the second plate 132 form a receiving room 135 receiving the light source 11 and the rear seat 122. The extending direction of the electrical pins 1221 is perpendicular to the second plate 132. The second plate 132 defines a number of strip holes 1321 for dissipating the heat. The fixing plates 133 are fixed to the front seat 121 by screws (no labeled), such that the fixing plates 133 press the front end 111 on the front seat 121, and therefore the light source 11 is fixed on the front seat 121. The supporting frame 134 is positioned on one edge of the second plate 132 facing away the front end 111 of the light source 11.

The wire structure 14 includes two connecting wires 141 and two joints 142. Each of the connecting wires 141 includes a wire 1411 and a protecting pipe 1412. The protecting pipe 1412 is made of high-temperature resistance material, such as, teflon. In this embodiment, the length of the protecting pipe 1412 is greatly shorter than the wire 1411. The protecting pipe 1412 is sleeved on one end of the wire 1411, and the other end of each of the wires 1411 is not sleeved with the protecting pipe 1412. Each of the joints 142 includes a first sleeve 1421 and a second sleeve 1422 connected to the first sleeve 1421. The extending direction of the first sleeve 1421 is perpendicular to the extending direction of the second sleeve 1422. The diameter of the first sleeve 1421 is slightly less than the diameter of the electrical pin 1221, and the diameter of the second sleeve 142 is slightly less than the diameter of the protecting pipe 1412. The first sleeve 1421 is sleeved on the electrical pin 1221. One end of the connecting wire 141 sleeved with the protecting pipe 1412 is received in the second sleeve 1422 and connected to the electrical pin 1221.

The connector 15 is received in the supporting frame 134, and one end of the connecting wire 141 facing away the second sleeve 1422 is electrically connected to the connector 15. The connector 15 is connected to an external power source (not shown).

In the embodiment, in order to dissipate the heat generated by the light source 11, a fan (no labeled) is positioned on the rear seat 122. The fan is electrically connected to the electrical pins 1221.

In use, the external power source supplies power to the light source 11 by the connector 15, the wires 1411, the joints 142, and the electrical pins 1221. The light source 11 produces a lot of high heat in working process. As the ends of the wires 1411 connected to the joints 142 are sleeved with the protecting pipes 1412, and the protecting pipes 1412 are made of high-temperature resistance material, the wires 1411 will not be burn down by the heat. Therefore, the reliability of the light source assembly 10 is increased. As the other portion of the wires 1411 are not sleeved with the protecting pipe 1412. Therefore, the flexural toughness of the wires 1411 will not be decreased.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light source assembly, comprising:
   a light source;
   a position seat comprising an electrical pin electrically connected to the light source; and
   a wire structure comprising a connecting wire, the connecting wire comprising:
      a wire; and
      a protecting pipe made of high-temperature resistance material and sleeved on one end of the wire;
   wherein the end of the wire sleeved with the protecting pipe is connected to the electrical pin.

2. The light source assembly of claim 1, wherein the light source comprises a front end and a rear end opposite to the front end, the light source emits light rays from the front end.

3. The light source assembly of claim 2, wherein the position seat comprises a front seat and a rear seat, the front seat is fixed at the front end of the light source, the rear seat is electrically connected to the rear end, and the electrical pin is positioned on the rear seat.

4. The light source assembly of claim 1, comprising a connector, wherein the other end of the wire away from the electrical pin is connected to the connector.

5. The light source assembly of claim 1, wherein the wire structure comprises a joint, the joint comprises a first sleeve and a second sleeve connected to the first sleeve, the first sleeve is sleeved on the electrical pin, the end of the wire sleeved with the protecting pipe is received in the second sleeve.

6. The light source assembly of claim 5, wherein a diameter of the first sleeve is slightly less than a diameter of the electrical pin, and a diameter of the second sleeve is slightly less than a diameter of the protecting pipe.

7. The light source assembly of claim 1, comprising a protecting case, wherein the protecting case comprises a receiving room receiving the light source.

8. The light source assembly of claim 1, wherein the protecting pipe is made of teflon.

* * * * *